US009405288B2

(12) United States Patent
Ogata

(10) Patent No.: US 9,405,288 B2
(45) Date of Patent: Aug. 2, 2016

(54) ROBOT APPARATUS AND CONTROLLING METHOD OF THE ROBOT APPARATUS

(71) Applicant: CANON KABUSHIKI KAISHA, Tokyo (JP)

(72) Inventor: Masaru Ogata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/663,104

(22) Filed: Mar. 19, 2015

(65) Prior Publication Data

US 2015/0277426 A1  Oct. 1, 2015

(30) Foreign Application Priority Data

Mar. 28, 2014 (JP) ................................. 2014-068280

(51) Int. Cl.
| | | |
|---|---|---|
| *G05B 19/04* | (2006.01) | |
| *G05B 19/404* | (2006.01) | |
| *B25J 9/16* | (2006.01) | |
| *B25J 13/08* | (2006.01) | |
| *B25J 19/02* | (2006.01) | |

(52) U.S. Cl.
CPC ............. *G05B 19/404* (2013.01); *B25J 9/1694* (2013.01); *B25J 13/087* (2013.01); *B25J 19/02* (2013.01); *G05B 2219/49213* (2013.01); *Y10S 901/46* (2013.01)

(58) Field of Classification Search
CPC .... G05B 19/404; B25J 9/1694; B25J 13/087; B25J 19/02
USPC ........................................................ 700/253
See application file for complete search history.

(56) References Cited

U.S. PATENT DOCUMENTS

| 4,864,206 A * | 9/1989 | Onaga ................ G05B 19/4062 318/568.11 |
| 6,291,959 B1 * | 9/2001 | Yoshida ............... G05B 19/404 318/567 |
| 2014/0067124 A1 * | 3/2014 | Williamson ......... G05B 19/406 700/258 |

FOREIGN PATENT DOCUMENTS

| CN | 102741021 | 10/2012 |
| EP | 0 357 166 | 7/1990 |

(Continued)

OTHER PUBLICATIONS

Chinese Office Action issued Apr. 19, 2016 during prosecution of related Chinese application No. 201510140115.5. (Whole English-language translation included.)

*Primary Examiner* — Ian Jen
(74) *Attorney, Agent, or Firm* — Fitzpatrick, Cella, Harper & Scinto

(57) ABSTRACT

A robot apparatus comprises: a robot body having a multi joint arm including a plurality of joints; a motor provided as a driving source of at least a part of the plurality of joints; and a controlling system capable of controlling the motor. The controlling system comprises a motion controlling unit configured to input a current to the motor to rotate the motor, a heat generation controlling unit configured to input the current to the motor to generate heat, without rotating the motor, and a controlling unit configured to calculate a temperature raising current necessary to rise up to a predetermined temperature without rotating the motor, to generate a current instruction for temperature raising to set the heat generation controlling unit to output the temperature raising current, and to transmit the current instruction for temperature raising to the heat generation controlling unit at stopping the robot body.

11 Claims, 6 Drawing Sheets

(56) References Cited

FOREIGN PATENT DOCUMENTS

| JP | 63-127885 | 5/1988 |
| JP | 63-127885 A | 5/1988 |
| JP | 4-256595 | 9/1992 |
| JP | 6-126672 | 5/1994 |
| JP | 8-323683 | 12/1996 |
| JP | 2008-235839 A | 10/2008 |

\* cited by examiner

ROBOT APPARATUS AND CONTROLLING METHOD OF THE ROBOT APPARATUS

BACKGROUND OF THE INVENTION

1. Field of the Invention

The present invention relates to a robot apparatus including a multi joint arm having a plurality of joints and to a controlling method of the robot apparatus.

2. Description of the Related Art

Conventionally, a robot apparatus is widely used, the robot apparatus including: a multi joint arm and an end effector (hereinafter, called "robot body"); and a control apparatus that controls the robot body. In general, the robot body includes a drive mechanism, such as a motor, and a transmission mechanism, such as a timing belt and a pulley. The drive mechanism including the motor and the transmission mechanism generate heat due to heat loss or friction during operation, and the mechanisms act as heat sources. Therefore, if the robot body is operated for a long time, the robot body enters a state (hereinafter, called "warmed-up state") in which the temperature is ten to several dozen ° C. higher than when the robot body is stopped.

In a production line provided with the robot body, there may be cases in which the operation of the robot body needs to be suspended even though the operation is possible, such as during maintenance, during off-hour stop and during temporary stop due to some reasons. The robot body does not generate heat in the operation stopping period, and the robot just after the operation is resumed is in a state (hereinafter, called "cooled state") in which the temperature is lower than in the warmed-up state.

It is known that if the robot body is operated under different temperature conditions such as the warmed-up state and the cooled state, the stop position of the robot body and the amount of errors at deceleration stop slightly vary between the states, and the motion accuracy of the robot body is reduced. Turning the robot body from the cooled state to the warmed-up state may take two to four hours after the start of operation, and for example, the motion accuracy of the robot body is reduced in 25 to 50% of the operation hours when the operation is eight hours a day. There is a problem that the work efficiency may be reduced.

To solve this, Japanese Patent Application Laid-Open No. 2008-235839 discloses a robot apparatus including a heater and a temperature sensor on the robot body, wherein the heater can heat the robot body. According to the robot apparatus, the robot body is mandatorily heated, and the temperature of the robot body is controlled at a suitable temperature in a feedback control using the temperature sensor, thereby reducing the time for switching the robot body from the cooled state to the warmed-up state.

Japanese Patent Application Laid-Open No. S63-127885 describes a robot apparatus including a temperature sensor on the robot body, wherein the amount of heat generation can be increased by adjusting a d-axis current to perform a vector control of a driving brushless motor. According to the robot apparatus, the d-axis current is adjusted to heat the robot body, and the temperature of the robot body is controlled at a suitable temperature in a feedback control using the temperature sensor, thereby reducing the time of switching the robot body from the cooled state to the warmed-up state.

However, the temperature sensors are mounted on the robot apparatuses described in Japanese Patent Application Laid-Open Nos. 2008-235839 and S63-127885. Therefore, there is a problem that the mechanism and the controlling system are complicated, and the cost of the robot apparatus is high. The setting temperature in the heating control of the robot body is not particularly taken into account. Therefore, there is a problem that the consumption of energy may be excessive due to an unnecessarily large amount of heat generation, or the heat generation may be insufficient.

SUMMARY OF THE INVENTION

According to an aspect of the present invention, a robot apparatus comprises: a robot body having a multi joint arm including a plurality of joints; a motor provided as a driving source of at least a part of the plurality of joints; and a controlling system capable of controlling the motor, wherein the controlling system comprises a motion controlling unit configured to input a current to the motor to rotate the motor, a heat generation controlling unit configured to input the current to the motor to generate heat, without rotating the motor, and a controlling unit configured to calculate a temperature raising current necessary to rise up to a predetermined temperature without rotating the motor, to generate a current instruction for temperature raising to set the heat generation controlling unit to output the temperature raising current, and to transmit the current instruction for temperature raising to the heat generation controlling unit at stopping the robot body.

According to a further aspect of the present invention, a controlling method of a robot apparatus, wherein the robot apparatus comprises: a robot body having a multi joint arm including a plurality of joints; a motor provided as a driving source of at least a part of the plurality of joints; and a controlling system having a controlling unit and inputting a current to the motor to generate at least one of a rotation of the motor and a heat, to control an operation of the robot body, wherein the method comprises: calculating, by the controlling unit, a temperature raising current necessary to rise up to a predetermined temperature without rotating the motor; and supplying, by the controlling unit, the temperature raising current to the motor for rising the temperature, at stopping the robot body.

According to a still further aspect of the present invention, a controlling method of a robot apparatus, wherein the robot apparatus comprises: a robot body having a multi joint arm including a plurality of joints; a motor provided as a driving source of at least a part of the plurality of joints; and a controlling system having a controlling unit and inputting a current to the motor to generate at least one of a rotation of the motor and a heat, to control an operation of the robot body, wherein the method comprises: calculating, by the controlling unit, a temperature raising current necessary to rise up to a predetermined temperature without rotating the motor; calculating, by the controlling unit, a temperature raising period necessary to rise the temperature of the robot body by the temperature raising current from a current temperature up to the predetermined temperature based on a thermal time constant, such that the temperature of the robot body rises to the predetermined temperature at a time of staring of the operation of the robot body, and supplying, by the controlling unit, the temperature raising current to the motor to start the temperature rising, the temperature raising period before the time of staring of the operation of the robot body.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
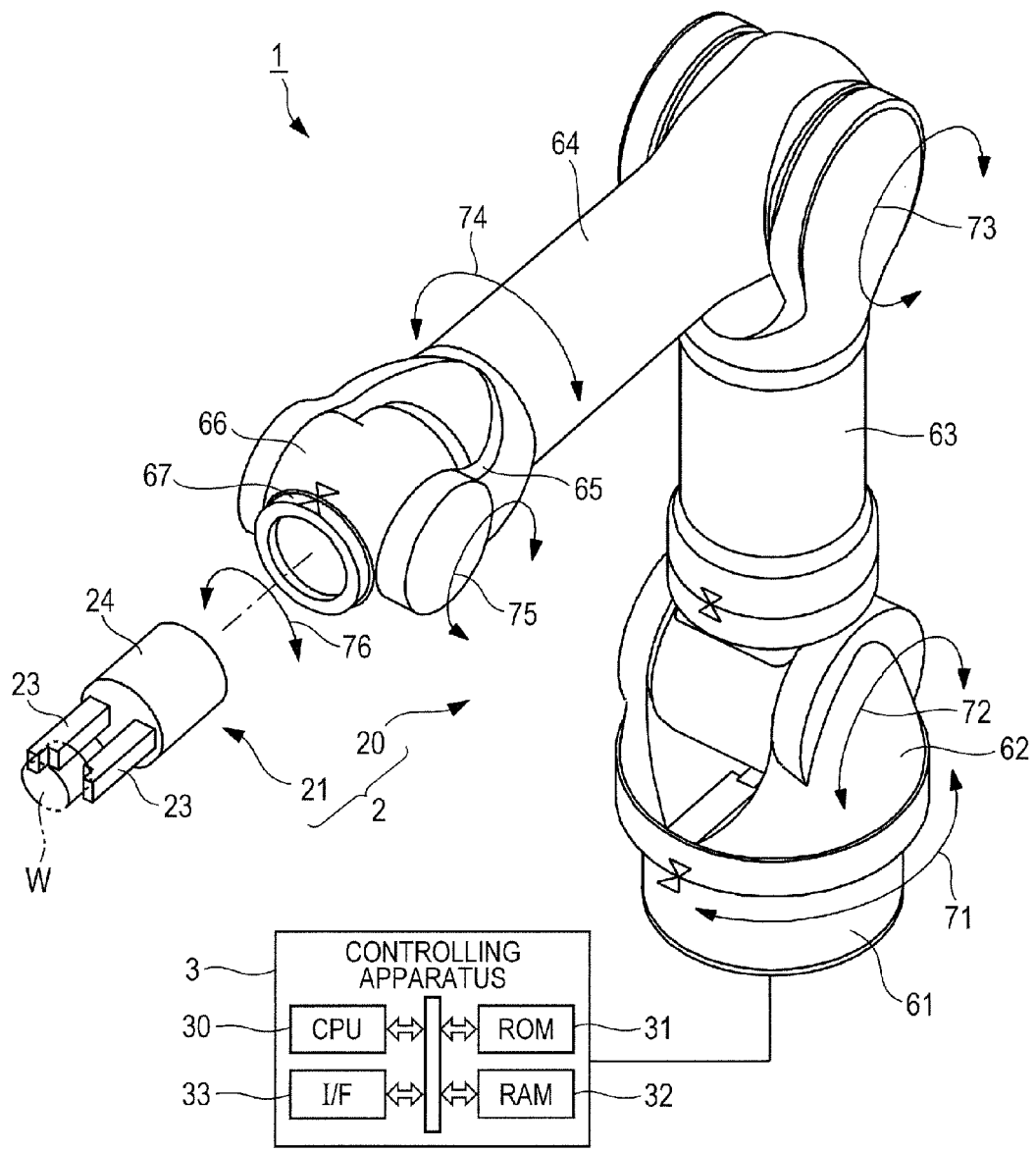
FIG. 1 is an explanatory diagram illustrating a schematic configuration of a robot apparatus according to an embodiment of the present invention.

As illustrated in FIG. 1, a robot apparatus 1 includes a robot body 2 and a control apparatus 3 that controls the robot body 2. The robot body 2 includes: a six-axis vertical multi joint arm (hereinafter, called "arm") 20 having a plurality of joints; and a hand 21 that is an end effector. Although the six-axis vertical multi joint arm is applied as the arm 20 in the present embodiment, the number of axes may be appropriately changed according to the application or the purpose.

The hand 21 is attached to and supported by a tip link 67 of the arm 20, and the degree of freedom of at least one of the position and the posture is adjusted by the operation of the arm 20. The hand 21 includes: a hand body 24; and a plurality of fingers 23 that are disposed to be able to move relative to the hand body 24 and that can grasp a workpiece W. The arm 20 includes: seven links 61 to 67; and six joints 71 to 76 for swingably and rotatably connecting the links 61 to 67. The lengths of the links 61 to 67 are fixed. However, for example, links that can be expanded and contracted by linear motion actuators may also be adopted.

Figure 2:
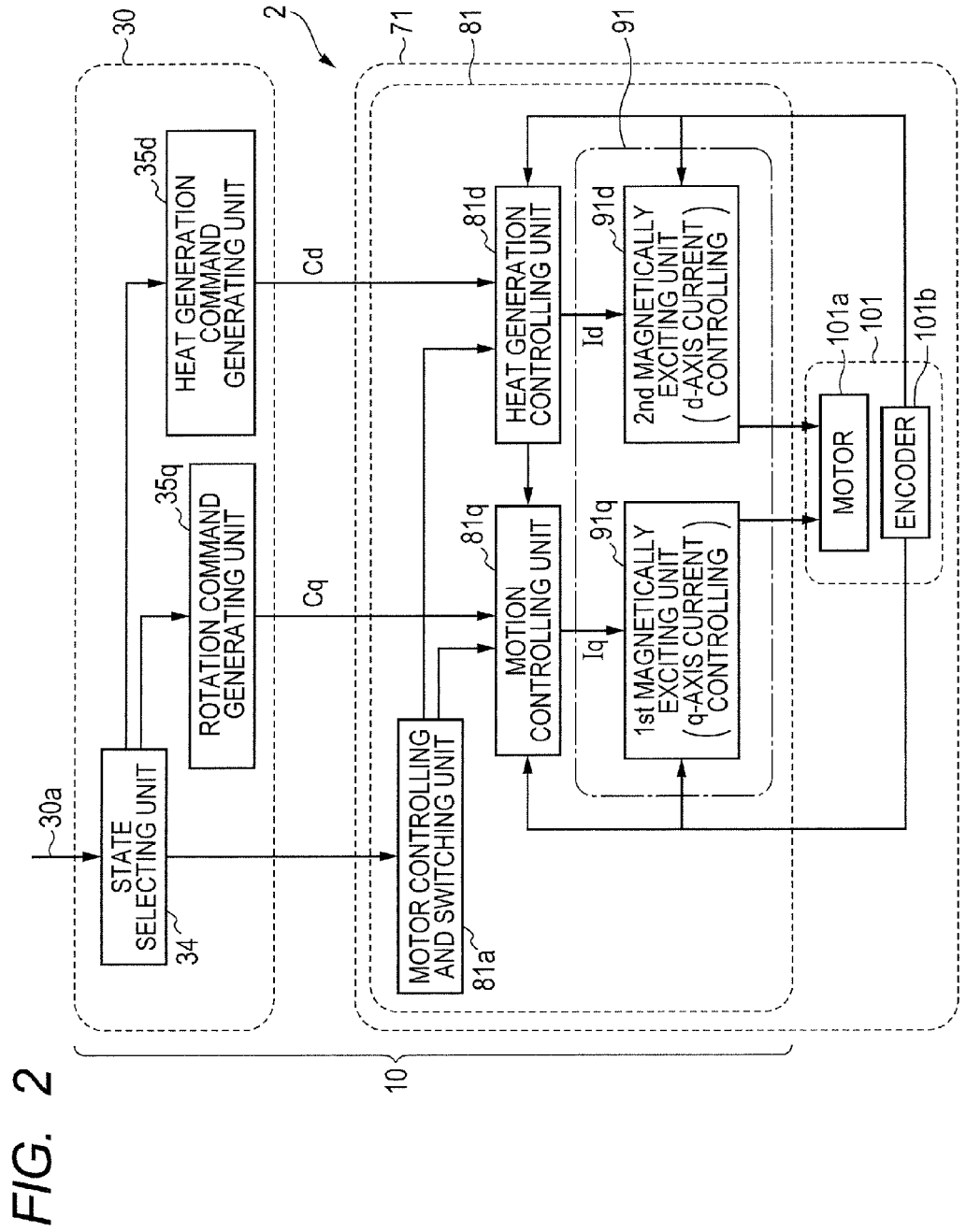
FIG. 2 is a block diagram illustrating a schematic configuration of the robot apparatus according to the embodiment of the present invention.

As illustrated in FIG. 2, for example, the joint 71 includes a joint mechanism 101 and a motor controlling unit 81. The joint mechanism 101 includes: a motor 101a that drives the joint 71; and an encoder 101b that detects the rotation angle of the motor 101a. The joint mechanism 101 also includes: a power transmission mechanism not shown including a timing belt and a pulley; a deceleration mechanism not shown including gears; and a brake mechanism not shown that supports the position and the posture when the motor 101a is not energized. The motor 101a is provided as a driving source of at least part of the plurality of joints 71 to 76, and for example, a brushless motor that can be controlled by a vector control based on a q-axis current and a d-axis current is used. The motor 101a and the encoder 101b are connected to the motor controlling unit 81, and the motor controlling unit 81 is connected to the control apparatus 3 described later.

The motor controlling unit 81 includes a motor controlling and switching unit 81a, a motion controlling unit 81q, a heat generation controlling unit 81d and a motor current controller 91. The motor controlling and switching unit 81a is configured to switch the control state of the motor 101a between a motion control and a heat generation control based on a signal transmitted from a state selecting unit 34 described later. The motion controlling unit 81q is configured to generate a torque instruction Iq of the motor 101a for controlling the motor 101a to an instructed rotation state based on a rotation command value Cq from a rotation command generating unit 35q described later. The heat generation controlling unit 81d is configured to generate a heat generation command Id for determining an amount of energizing current for raising the temperature of the motor 101a to an instructed heat generation state based on a heat generation command value Cd from a heat generation command generating unit 35d described later.

The motor current controller 91 includes: a 1st magnetically exciting unit 91q that determines a voltage Vq output to a winding of the motor 101a based on the torque instruction Iq; and a 2nd magnetically exciting unit 91d that determines a voltage Vd output to the winding of the motor 101a based on the heat generation command Id.

Figure 3:
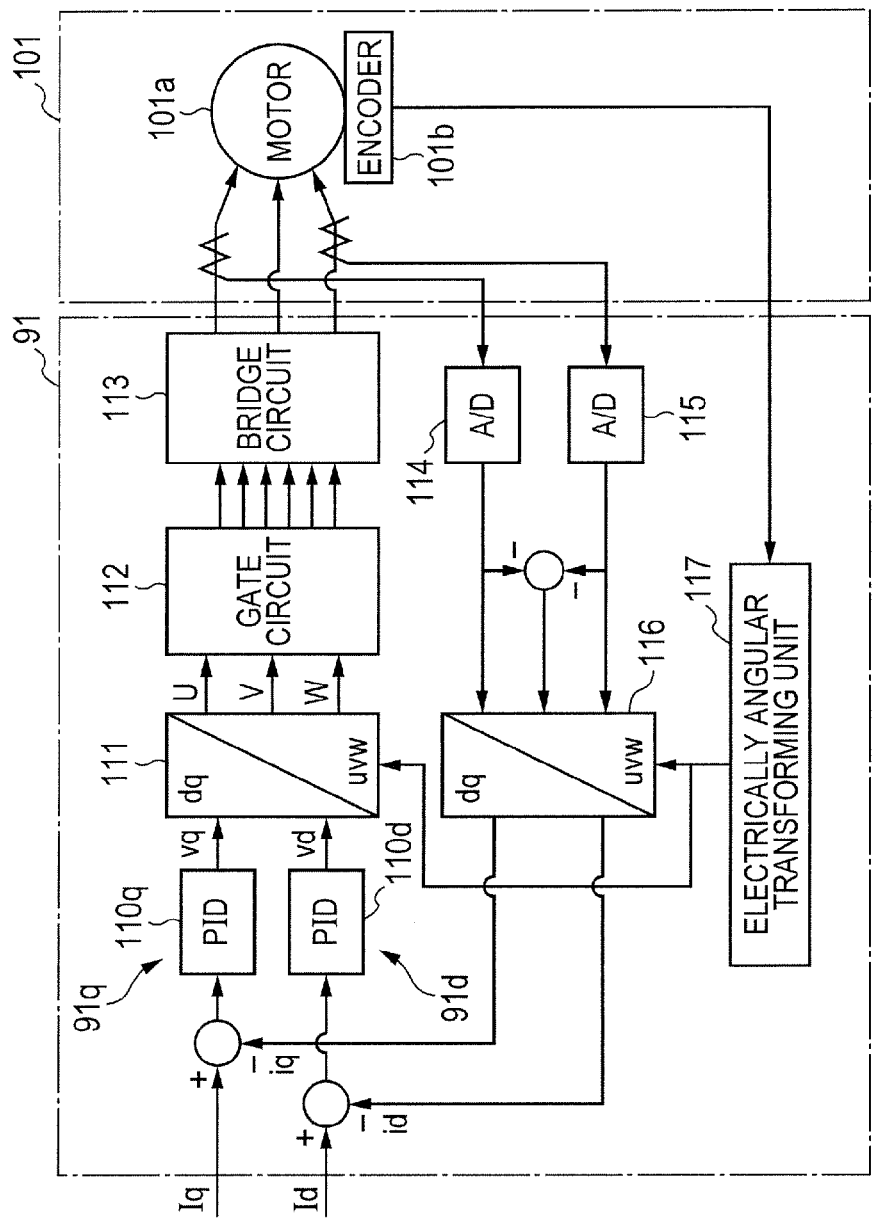
FIG. 3 is an explanatory diagram illustrating a schematic configuration of a current controller of the robot apparatus according to the embodiment of the present invention.

As illustrated in FIG. 3, the motor current controller 91 calculates a difference between the input torque instruction Iq and a torque contribution current iq described later, and an output value vq is output after calculation by PID (proportional integral derivative) control in a PID control calculating unit 110q. The arithmetic expression in this case is as in Expression 1.

$$vq_{n,k+1} = Kp_{iq} \cdot eq_{n,k} + Ki_{iq}\{eq_{n,1} + eq_{n,2} + \ldots + eq_{n,k-1} + eq_{n,k}\} + Kd_{iq}(eq_{n,k} - eq_{n,k-1})$$

$$eq_{n,k} = Iq_{n,k} - iq_{n,k} \quad \text{[Expression 1]}$$

$Kp_{iq}$: proportional control gain of PID control, $Ki_{iq}$: integral control gain of PID control, $Kd_{iq}$: derivative control gain of PID control, n: identification index of motor current controller, k: index increased by 1 in each control period, $Iq_{n,k}$: torque instruction value at time k+1 of motor current controller n, $iq_{n,k}$: torque contribution current at time k+1 of motor current controller n, $vq_{n,k+1}$: q-axis output at time k+1 of motor current controller n The motor current controller 91 calculates a difference between the input heat generation command Id and a heat generation current id described later, and an output value vd is output after calculation by PID control in a PID control calculating unit 110d. The arithmetic expression in this case is as in Expression 2.

$$vd_{n,k+1} = Kp_{id} \cdot ed_{n,k} + Ki_{id}\{ed_{n,1} + ed_{n,2} + \ldots + ed_{n,k-1} + ed_{n,k}\} + Kd_{id}(ed_{n,k} - ed_{n,k-1})$$

$$ed_{n,k} = Id_{n,k} - id_{n,k} \quad \text{[Expression 2]}$$

$Kp_{id}$: proportional control gain of PID control, $Ki_{id}$: integral control gain of PID control, $Kd_{id}$: derivative control gain of PID control, n: identification index of motor current controller, k: index increased by 1 in each control period, $Id_{n,k}$: heat generation command value at time k+1 of motor current controller n, $id_{n,k}$: heat generation current at time k+1 of motor current controller n, $vd_{n,k+1}$: d-axis output at time k+1 of motor current controller n An output duty value calculating unit 111 transforms the output values vq and vd into phase voltages U, V and W and calculates output duty values according to the phase voltages U, V and W. The transformation expression here is as in Expression 3.

$$\begin{bmatrix} U \\ V \\ W \end{bmatrix} = \sqrt{\frac{2}{3}} \begin{bmatrix} \cos(\theta e) & \sin(\theta e) \\ \cos\left(\theta e + \frac{2\pi}{3}\right) & \sin\left(\theta e + \frac{2\pi}{3}\right) \\ \cos\left(\theta e + \frac{4\pi}{3}\right) & \sin\left(\theta e + \frac{4\pi}{3}\right) \end{bmatrix} \begin{bmatrix} vd \\ vq \end{bmatrix} \quad \text{[Expression 3]}$$

A gate circuit 112 and a bridge circuit 113 perform on-off control of a switching element through PWM and input the output duty values of the phase voltages U, V and W to the motor 101a. In this way, the amount of drive current (q-axis current) of the 1st magnetically exciting unit 91q and the amount of drive current (d-axis current) of the 2nd magnetically exciting unit 91d can be independently controlled.

A current detection element is provided on a connection line between the bridge circuit 113 and the motor 101a, and the current detection element measures currents of the U phase and the V phase of the motor 101a as voltages. A/D converters 114 and 115 transform the measured voltages into quantized numerical data. A current value calculating unit 116 transforms the numerical data from the A/D converters 114 and 115 into the torque contribution current iq and the heat generation current id with reference to numerical data obtained by an electrically angular transforming unit 117 transforming a detection signal from the encoder 101b. The transformation expression here is as in Expression 4.

$$\begin{bmatrix} id \\ iq \end{bmatrix} = \sqrt{\frac{2}{3}} \begin{bmatrix} \cos(\theta e) & \cos\left(\theta e + \frac{2\pi}{3}\right) & \cos\left(\theta e + \frac{4\pi}{3}\right) \\ \sin(\theta e) & \sin\left(\theta e + \frac{2\pi}{3}\right) & \sin\left(\theta e + \frac{4\pi}{3}\right) \end{bmatrix} \begin{bmatrix} iu \\ -iu - iw \\ iw \end{bmatrix}$$ [Expression 4]

Configurations of the other joints 72 to 76 are the same as the configuration of the joint 71, and the details will not be described. Hereinafter, only the joint 71 will be described on behalf of the joints 71 to 76 and the motors and the like included in the joints 71 to 76.

The control apparatus 3 is formed by a computer and can control the motor 101a to control the robot body 2. As illustrated in FIG. 1, the computer forming the control apparatus 3 includes, for example: a CPU (controlling unit) 30; a ROM 31 that stores programs for controlling components; a RAM 32 that temporarily stores data; and an input/output interface circuit (I/F) 33.

As illustrated in FIG. 2, the CPU 30 includes the rotation command generating unit 35q, the heat generation command generating unit 35d and the state selecting unit 34.

The rotation command generating unit 35q is configured to set a time-series target value of the motion state of the motor 101a based on teaching data recorded in advance in the RAM 32 and to output the target value as the rotation command value Cq. The rotation command value Cq is input to the motion controlling unit 81q, and the motor 101a is rotated and driven by the q-axis current controlling.

The heat generation command generating unit 35d is configured to estimate the load, i.e. output torque, of the motor 101a by means of mechanical analysis or the like. More specifically, when the motor 101a operates based on the teaching data, the heat generation command generating unit 35d calculates the motion state, such as angle (position), (angular) velocity, (angular) acceleration and torque, and estimates the output torque based on the motion state. The heat generation command generating unit 35d is configured to calculate a temperature rising current necessary for rising up to a predetermined temperature without rotating the motor 101a. The heat generation command generating unit 35d is further configured to generate a current instruction for temperature rising to set the heat generation controlling unit 81d to output the temperature rising current and to output the instruction as the generation instruction value Cd. The heat generation command value Cd is input to the heat generation controlling unit 81d, and the temperature is raised without rotation and drive of the motor 101a by the d-axis current controlling. The predetermined temperature here is a temperature estimated to reach if the robot body 2 operates without stopping, the temperature estimated when the robot body 2 is stopped. The temperature rising current can be calculated as an amount of current obtained by integrating the current value and the energizing period, and the current value and the energizing period can be appropriately adjusted within permissible ranges.

The state selecting unit 34 is configured to select one of an operation mode and a heat generation mode for the operation state of the robot body 2 based on a signal 30a indicating the state of the entire line of a factory. For example, when the signal 30a indicating that the entire line is normally operating is input, the state selecting unit 34 is configured to transmit a signal to the rotation command generating unit 35q to rotate and drive the motor 101a (operation mode). When the signal 30a indicating that part of the line is stopped is input, the state selecting unit 34 is configured to transmit a signal to the heat generation command generating unit 35d to generate heat without rotating the motor 101a (heat generation mode). More specifically, the CPU 30 is configured to transmit the heat generation command value Cd to the heat generation controlling unit 81d when the robot body 2 is stopped.

In the present embodiment, the motor controlling unit 81 and the CPU 30 form the controlling system 10 that can control the operation of the robot body 2. More specifically, the controlling system 10 includes: the motor controlling unit 81 provided on the robot body 2 and having the motion controlling unit 81q and the heat generation controlling unit 81d; and the CPU 30 provided separately from the robot body 2 and having the heat generation command generating unit 35d.

A procedure of a controlling method of the robot apparatus 1 will be described along with a flow chart illustrated in FIG. 4. It is assumed that the robot apparatus 1 here is used in, for example, a factory, and the robot body 2 performs an operation of repeating the same operation. A cycle operation here denotes a series of operation repeated by the robot body 2. An operation period denotes a period from the start of one cycle operation to the start of the next cycle operation. A waiting operation denotes a state that the robot body 2 is static after the end of one cycle operation, before the start of the next cycle operation.

Figure 4:
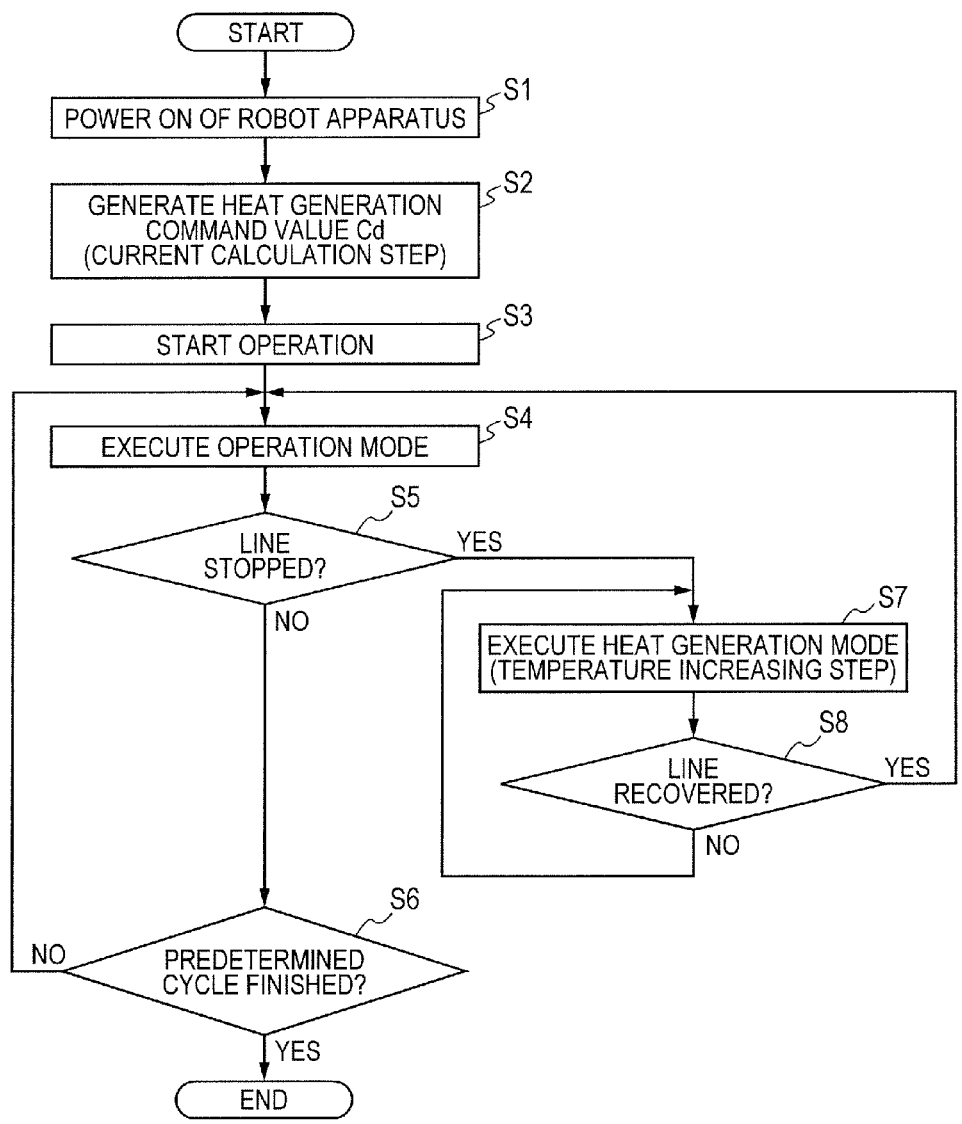
FIG. 4 is a flow chart illustrating a procedure when the robot apparatus is temporarily stopped during operation according to the embodiment of the present invention.

As illustrated in FIG. 4, the power of the robot apparatus 1 is turned on when the operation of the line of the factory is started (step S1). The heat generation command generating unit 35d of the CPU 30 calculates the output torque based on the teaching data and generates the heat generation command value Cd (step S2, current calculation step). More specifically, in the current calculation step, the CPU 30 uses the output torque to calculate the temperature rising current necessary for rising up to the predetermined temperature without rotating the motor 101a and generates the heat generation command value Cd for generating the temperature rising current.

Specifically, the heat generation command generating unit 35d determines the operation period of the robot based on a timing chart of the robot operation that is set at the design of the production line. The heat generation command generating unit 35d calculates the motor driving torque of the robot body 2 at the cycle operation of the robot body 2 based on kinetic analysis. In general, the driving torque of the motor is in a proportional relationship with the q-axis current (T=Ki, T: motor torque, i: q-axis current, K: torque constant). Therefore, the value obtained by dividing the torque T by the torque constant K represents the q-axis current, i.e. motor current. The motor current at the waiting operation is also calculated in the same way as this method. The heat generation command value Cd is a value that causes the heat generation controlling unit 81d to operate to form a time-series cycle in which the q-axis current at the operation period is applied in the operation period, and the q-axis current at the waiting operation is applied in the waiting operation. More specifically, the load is estimated from time-series data obtained by dividing the driving torque of the motor, which is obtained from the kinetic analysis, by the torque constant in the method here.

Subsequently, when the operation of the robot apparatus 1 is started (step S3), a predetermined operation, such as assembly, is executed. When the line is normally operating, the signal 30a indicating the normal operation is transmitted from an upper level, and the state selecting unit 34 selects and executes the operation mode (step S4). In the operation mode, the rotation command generating unit 35q generates the rotation command value Cq and transmits the rotation command value Cq to the motion controlling unit 81q. In the motor controlling unit 81, the motor controlling and switching unit 81a starts the motion controlling unit 81q. The motion controlling unit 81q is a servo mechanism that controls the motion state of the motor 101a. The motion controlling unit 81q determines the torque instruction Iq based on the rotation angle and the rotation command value Cq from the encoder 101b and causes the 1st magnetically exciting unit 91q to control the q-axis current to control the rotation of the motor 101a. On the other hand, the heat generation controlling unit 81d is stopped, and 0 is always output as the heat generation command Id. The 2nd magnetically exciting unit 91d controls the excitation current (d-axis current) id to be always 0.

The CPU 30 determines whether the line is stopped based on the signal 30a from the upper level that is input to the state selecting unit 34 (step S5). If the CPU 30 determines that the line is not stopped, the CPU 30 determines whether the predetermined cycle is finished (step S6). The CPU 30 finishes the process if the CPU 30 determines that the predetermined cycle is finished and continues the operation mode if the CPU 30 determines that the predetermined cycle is not finished (step S4). The temperature of the robot body 2 rapidly rises after the start of the operation of the robot body 2, and the temperature becomes substantially constant after some time (see times 0 to $t_1$ of FIG. 5).

On the other hand, if the line is stopped for an unexpected reason, the signal 30a indicating the stop is transmitted from the upper level, and the CPU 30 determines that the line is stopped in step S5. The state selecting unit 34 selects the heat generation mode (step 7, temperature rising step). More specifically, in the temperature rising step, the CPU 30 supplies the temperature rising current to the motor 101a to raise the temperature when the robot body 2 is stopped.

In the heat generation mode, the heat generation command generating unit 35d transmits the heat generation command value Cd generated in advance to the heat generation controlling unit 81d. The heat generation command value Cd generated in advance may be appropriately changed depending on the situation of the stop. In the motor controlling unit 81, the motor controlling and switching unit 81a stops the motion controlling unit 81q and starts the heat generation controlling unit 81d. When the stop signal is received, the motion controlling unit 81q always outputs 0 as the torque instruction Iq, and the motor 101a does not output torque. The heat generation controlling unit 81d determines the heat generation command Id based on the rotation angle and the heat generation command value Cd from the encoder 101b and outputs the heat generation command Id to the 2nd magnetically exciting unit 91d. The 2nd magnetically exciting unit 91d applies a current for heat generation equivalent to that in the operation mode to the motor 101a to thereby maintain the heat generation state of the motor 101a in the same state as during the operation. In this case, the motor 101a does not support the torque, and thus the brake mechanism supports the joints 71 to 76 of the robot body 2.

The CPU 30 determines whether the line is recovered based on the signal 30a from the upper level that is input to the state selecting unit 34 (step S8). If the CPU 30 determines that the line is not recovered, the CPU 30 continues the heat generation mode (step S7). If the CPU 30 determines that the line is recovered, the CPU 30 executes the operation mode again (step S4). In this case, the robot body 2 in the heat generation mode is in the warmed-up state equivalent to that in the operation mode, and an operation with accuracy equivalent to before the stop of the line can be immediately resumed.

A procedure of a controlling method of the robot apparatus 1 when the temperature rising is started before the start of the operation of the robot body 2 will be described along with a flow chart illustrated in FIG. 6. For example, a case in which the robot body 2 installed on the line of the factory is warmed up at the start of operation in the morning will be described here.

Figure 6:
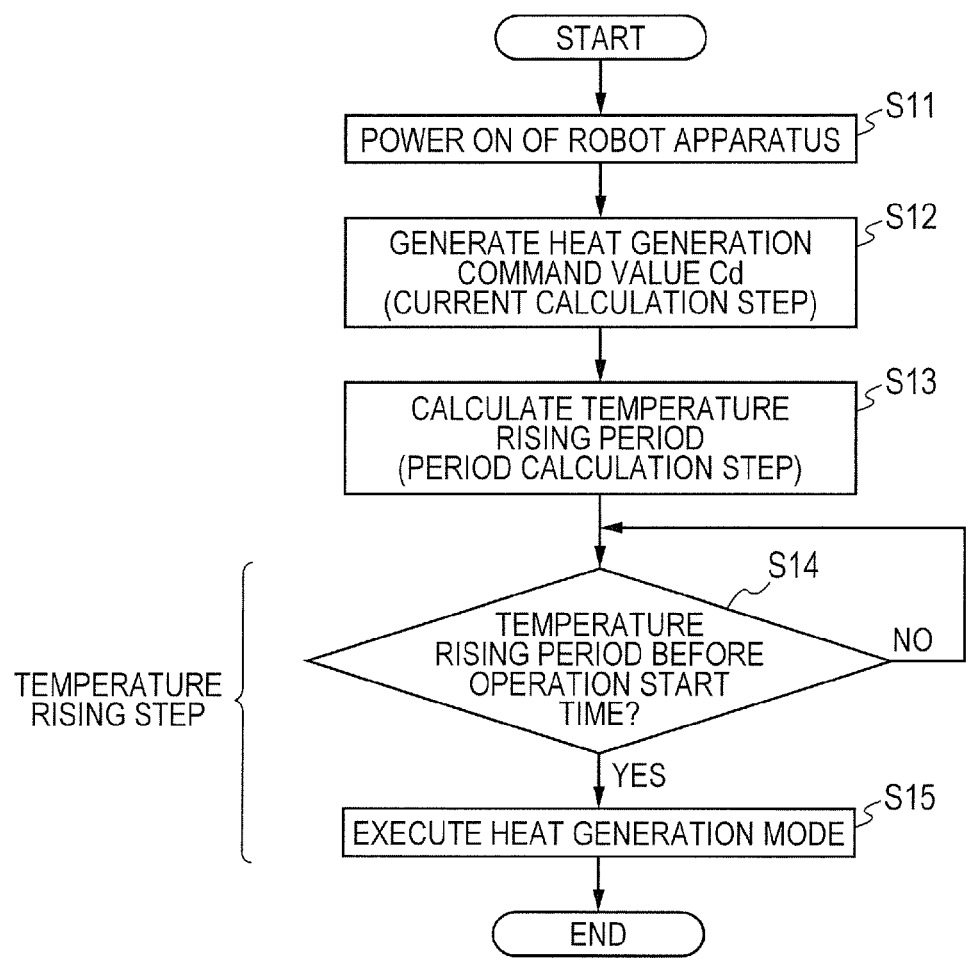
FIG. 6 is a flow chart illustrating a procedure when the temperature is raised before the operation of the robot apparatus according to the embodiment of the present invention.

As illustrated in FIG. 6, the power of the robot apparatus 1 is turned on before the start of operation of the line of the factory (for example, several hours before) (step S11). For example, the power is turned on at the closing time of the previous day. The heat generation command generating unit 35d calculates the output torque based on the teaching data and generates the heat generation command value Cd (step S12, current calculation step). More specifically, in the current calculation step, the CPU 30 uses the output torque to calculate the temperature rising current necessary for rising up to the predetermined temperature without rotating the motor 101a and generates the heat generation command value Cd for generating the temperature rising current.

The heat generation command generating unit 35d calculates a temperature rising period necessary for the temperature rising from the current temperature to the predetermined temperature based on a thermal time constant at the temperature rising of the robot body 2 based on the temperature rising current (step S13, period calculation step). In the period calculation step, the temperature rising period is calculated such that the robot body 2 rises to the predetermined temperature at the operation start time of the robot body 2. For example, a detection value from the temperature sensor provided on the robot body 2 may be used as the current temperature here, or the air temperature may be taken into account to appropriately input the current temperature. The user appropriately inputs the operation start time.

The CPU 30 determines whether the current time is the temperature rising period before the operation start time (step S14). If the CPU 30 determines that the current time is not the temperature rising period before the operation start time, the CPU 30 determines the time again (step S14, temperature rising step). If the CPU 30 determines that the current time is the temperature rising period before the operation start time, the CPU 30 supplies the temperature rising current to the motor 101a to start raising the temperature (step S15, temperature rising step). The method of raising the temperature here is the same as in step S7 of FIG. 4, and the details will not be described.

As a result, at the start of the operation of the robot body 2, the robot body 2 is in the warmed-up state equivalent to that in the normal operation, and an operation with accuracy equivalent to that in the normal operation can be immediately executed.

As described, according to the robot apparatus 1 of the present embodiment, the CPU 30 calculates the temperature rising current necessary for rising up to the predetermined temperature without rotating the motor 101a and raises the temperature up to the predetermined temperature when the robot body 2 is stopped. Therefore, the temperature can be raised when the robot body 2 is stopped, without mounting other members, such as a temperature sensor, on the robot body 2. Moreover, the temperature is raised up to the predetermined temperature, and thus the temperature can be properly raised by preventing excessive temperature rising and insufficient temperature rising.

According to the robot apparatus 1 of the present embodiment, the heat generation command generating unit 35d uses mechanical analysis to estimate the load, i.e. output torque, of the motor 101a, and thus highly accurate control is possible. More specifically, when the running resistance (friction and viscous load) of the driving system of the robot body 2 is large, the mechanical load (running resistance) of the driving system is large, in addition to the heat generation (Joule heat) caused by the application of the current to the motor. In this case, the heat generation of the driving system caused by the transformation of the kinetic energy of the robot into heat becomes too large to ignore. The energy loss in this case can be assessed by some kind of analysis model, and the equivalent amount of heat generation can be added to the heat generation command value equivalent to the driving torque calculated so far, thereby allowing to calculate an amount of heat generation close to the actual amount.

In the embodiment, although the CPU 30 sets the temperature rising current based on the driving torque of the robot body 2 estimated when the robot body 2 performs the predetermined operation, the arrangement is not limited to this. For example, the temperature rising current may be set based on the actual measurement value of the current applied to the motor 101a when the robot body 2 actually performs the predetermined operation. In this case, for example, time history responses of the q-axis current in the cycle operation are continuously recorded after the temperature state becomes stable during the operation of the robot body 2. Similarly, the drive currents in the operation period and the waiting operation are continuously recorded during the actual work. The average of the obtained time history responses of the motor currents of the plurality of cycles at each time, the average in the operation period, and the average in the waiting operation are calculated. For the instruction value of the d-axis current at the heat generation control, the average of the time history responses at each time is repeatedly output for each average in the operation period. The average current value in the waiting operation is used as the instruction value before the start of the next cycle. According to this method, complicated calculation is not necessary, and the setting is easy.

Although the operation of the brake mechanism is not particularly limited in the embodiment, the heat generation control may be implemented in a state that the output torque of the motor 101a is 0, and the brake mechanism arranged on the joint supports the weight, for example. In this case, the joint can be surely fixed without the torque of the motor 101a.

Alternatively, the output torque of the motor 101a may support static components of load, i.e. weight and starting torque, and the instruction value in the heat generation control may be an amount equivalent to the load based on estimated dynamic components of load, such as velocity and acceleration. In this case, the motor 101a alone can fix the joint, without the operation of the brake mechanism.

In the heat generation control, the brake mechanism arranged on the joint may be in a free state in which the weight is not supported. In this case, the brake mechanism also generates heat, and the heat can also be used to raise the temperature of the robot body 2.

The CPU 30 specifically executes the processing operations of the present embodiment. Therefore, a recording medium recording a robot control program of software that realizes the functions may be supplied to the CPU 30, and the CPU 30 may read and execute the program stored in the recording medium to attain the functions. In this case, the program read from the recording medium realizes the functions of each embodiment, and the present invention includes the robot control program and the recording medium recording the program.

The computer-readable recording medium is the ROM 31, and the program is stored in the ROM 31 in the description of the present embodiment. However, the arrangement is not limited to this. The program may be recorded in any recording medium as long as the medium is a computer-readable recording medium. For example, an HDD, an external storage apparatus or a recording disk may be used as the recording medium for supplying the program.

According to the present invention, the controlling unit calculates the temperature rising current necessary for rising up to the predetermined temperature without rotating the motor and supplies the temperature rising current to the motor to raise the temperature up to the predetermined temperature when the robot body is stopped. Therefore, the temperature can be raised when the robot body is stopped, without mounting other members, such as a temperature sensor, on the robot body. Moreover, the temperature is raised up to the predetermined temperature, and the temperature can be properly raised by preventing excessive temperature rising and insufficient temperature rising.

EXAMPLES

Figure 5:
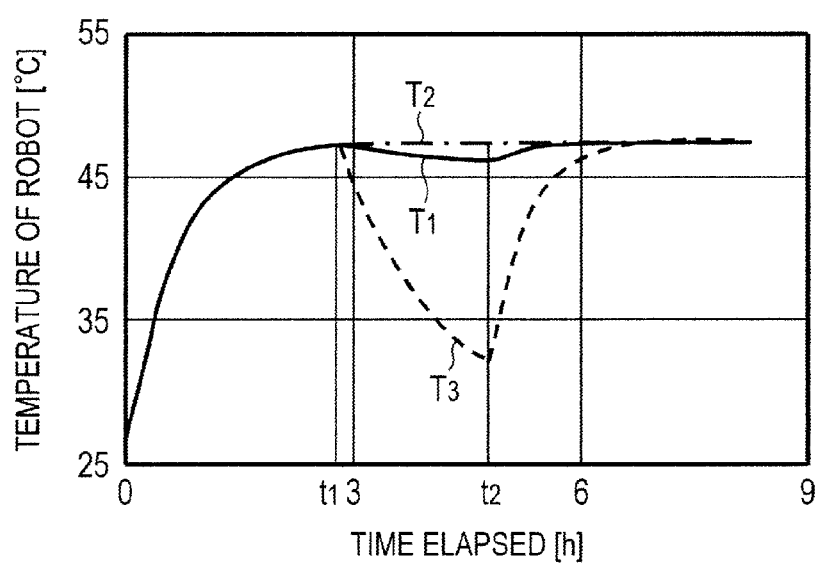
FIG. 5 is a graph illustrating a relationship between a time elapsed and a temperature of a robot body when the robot apparatus is temporarily stopped during operation according to the embodiment of the present invention.

A relationship between the time elapsed after the operation when the predetermined operation is performed and the temperature of the robot body is obtained for the robot apparatus installed on the line of the factory. FIG. 5 illustrates the results. In FIG. 5, the line is stopped at $t_1$, and the line is recovered at $t_2$.

Embodiment $T_1$ of FIG. 5 indicates the result in the robot apparatus 1 of the present embodiment.

Comparative Example 1

$T_2$ of FIG. 5 indicates the result when the operation of the robot body 2 is not stopped even in the range of $t_1$ to $t_2$ in the robot apparatus 1 of the present embodiment.

Comparative Example 2

$T_3$ of FIG. 5 indicates the result when the temperature rising operation is not performed even in the range of $t_1$ to $t_2$ in the robot apparatus 1 of the present embodiment.

As is clear from the results, in the range of $t_1$ to $t_2$, the robot body 2 of the present embodiment can maintain substantially the same temperature as that of Comparative Example 1 in which the robot body 2 is not stopped. The robot body 2 of the present embodiment can also recover the equilibrium state of the temperature in a short time compared to Comparative Example 2 in which the temperature rising operation is not performed in the range of $t_1$ to $t_2$. Therefore, it is confirmed that highly accurate operation can be immediately performed after the recovery of the operation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-068280, filed Mar. 28, 2014, which is hereby incorporated by reference herein in its entirety.

What is claimed is:

1. A robot apparatus comprising:
a robot body having a multi joint arm including a plurality of joints;
a motor provided as a driving source of at least a part of the plurality of joints; and
a controlling system capable of controlling the motor, wherein
the controlling system comprises
a motion controlling unit configured to input a current to the motor to rotate the motor,
a heat generation controlling unit configured to input the current to the motor to generate heat, without rotating the motor, and
a controlling unit configured to calculate a temperature raising current necessary to rise up to a predetermined temperature without rotating the motor, to generate a current instruction for temperature raising to set the heat generation controlling unit to output the temperature raising current, and to transmit the current instruction for temperature raising to the heat generation controlling unit at stopping the robot body.

2. The robot apparatus according to claim 1, wherein
the motor is a brushless motor being controllable according a vector control based on a q-axis current or a d-axis current, and
the motion controlling unit inputs the q-axis current to the motor, to generate the rotation, and inputs the d-axis current to the motor, to generate the heat without rotating the rotation.

3. The robot apparatus according to claim 1, wherein
the temperature raising current is set based on an actual measurement value of a current energizing the motor to perform a predetermined operation actually.

4. The robot apparatus according to claim 1, wherein
the temperature raising current is set based on an estimated driving torque of the robot body, to perform a predetermined operation.

5. The robot apparatus according to claim 1, wherein
the predetermined temperature is a temperature estimated at a time of stopping the robot as a temperature up to which the temperature of the robot rises by operating the robot without stopping.

6. The robot apparatus according to claim 1, wherein
the controlling unit calculate a temperature raising period necessary to rise the temperature of the robot body by the temperature raising current from a current temperature up to the predetermined temperature based on a thermal time constant, such that the temperature of the robot body rises to the predetermined temperature at a time of staring of the operation of the robot body, and
the controlling unit transmits the current instruction for temperature raising to the heat generation controlling unit, the temperature raising period before the time of staring of the operation of the robot body.

7. The robot apparatus according to claim 1, wherein
the controlling system comprises:
a motor controlling unit having disposed in the robot body and having the motion controlling unit and the heat generation controlling unit, and the controlling unit disposed separately from the robot body.

8. A controlling method of a robot apparatus, wherein the robot apparatus comprises:
a robot body having a multi joint arm including a plurality of joints;
a motor provided as a driving source of at least a part of the plurality of joints; and
a controlling system having a controlling unit and inputting a current to the motor to generate at least one of a rotation of the motor and a heat, to control an operation of the robot body, wherein the method comprises:
calculating, by the controlling unit, a temperature raising current necessary to rise up to a predetermined temperature without rotating the motor; and
supplying, by the controlling unit, the temperature raising current to the motor for rising the temperature, at stopping the robot body.

9. A controlling method of a robot apparatus, wherein the robot apparatus comprises:
a robot body having a multi joint arm including a plurality of joints;
a motor provided as a driving source of at least a part of the plurality of joints; and a controlling system having a controlling unit and inputting a current to the motor to generate at least one of a rotation of the motor and a heat, to control an operation of the robot body, wherein the method comprises:

calculating, by the controlling unit, a temperature raising current necessary to rise up to a predetermined temperature without rotating the motor;

calculating, by the controlling unit, a temperature raising period necessary to rise the temperature of the robot body by the temperature raising current from a current temperature up to the predetermined temperature based on a thermal time constant, such that the temperature of the robot body rises to the predetermined temperature at a time of staring of the operation of the robot body, and supplying, by the controlling unit, the temperature raising current to the motor to start the temperature rising, the temperature raising period before the time of staring of the operation of the robot body.

10. A non-transitory computer-readable recording medium storing a readable program for operating a computer to execute a controlling method of a robot apparatus according to claim 8.

11. A non-transitory computer-readable recording medium storing a readable program for operating a computer to execute a controlling method of a robot apparatus according to claim 9.

* * * * *